United States Patent [19]
Martin

[11] 3,778,006
[45] Dec. 11, 1973

[54] CONVEYING INSTALLATIONS USING PNEUMATIC TUBES
[75] Inventor: Rene Jean Martin, Villeneuve-La-Garenne, France
[73] Assignee: Societe Francaise Des Tubes Pneumatiques, Haute de Seine, France
[22] Filed: Apr. 17, 1972
[21] Appl. No.: 244,655

[30] Foreign Application Priority Data
June 30, 1971 France .............................. 7124015

[52] U.S. Cl. ...................................... 243/19, 243/2
[51] Int. Cl. ........................................... B65g 51/32
[58] Field of Search ...................... 243/19, 1, 38, 13, 243/2; 137/533.17, 533.19

[56] References Cited
UNITED STATES PATENTS

| | | | |
|---|---|---|---|
| 3,410,501 | 11/1968 | Thorburn | 243/5 |
| 564,427 | 7/1896 | Jacques | 243/5 |
| 55,531 | 6/1866 | Peabody | 137/533.19 |
| 1,565,650 | 12/1925 | Kee | 137/533.17 |
| 1,609,924 | 12/1926 | Witman | 137/533.17 |
| 3,306,555 | 2/1967 | Tonne | 243/19 |

FOREIGN PATENTS OR APPLICATIONS

| | | | |
|---|---|---|---|
| 1,192,981 | 5/1965 | Germany | 243/19 |
| 1,207,880 | 12/1965 | Germany | 243/19 |

*Primary Examiner*—Evon C. Blunk
*Assistant Examiner*—James L. Rowland
*Attorney*—Karl W. Flocks

[57] ABSTRACT

The present invention deals with improvements to conveyor installations using pneumatic tubes.

Said improvements comprise connecting the pneumatic tube element closed at one of its extremities is a dispatching-receiving station with the conduit of a pumping machine by means of two pipes each provided with a one-way floating clapper-valve, said valves being mounted in opposition, the pipe closer to the closed extremity of the pneumatic tube element permitting the passage of air only from the conduit of the pumping machine towards the pneumatic tube.

This improvement is particularly simple, effective and reliable for conveyor installations provided with a single pneumatic tube connecting different dispatching-receiving stations.

2 Claims, 5 Drawing Figures

CONVEYING INSTALLATIONS USING PNEUMATIC TUBES

The present invention relates to improvements in conveyor installations using pneumatic tubes, and especially those in which the conveyance of pneumatic carriers is effected in a single pneumatic tube, either in one direction or in the other. These improvements concern the device for braking the pneumatic carriers, especially at the moment of their arrival at a station of the system which is capable not only of receiving but also of despatching carriers of this kind.

The advantage of the pneumatic tube is that it conveys the documents or samples which are entrusted to it as rapidly as possible. It is therefore essential to slow down the arrival of the carriers holding these documents or samples so as to prevent a violent shock liable to cause a considerable noise and abnormal wear of the equipment at the receiving stations, and even damage to the carriers themselves and fragile objects carried by this means.

A known method of obtaining this braking, and which is simple and effective, consists of causing the carriers to arrive in an element of the pneumatic tube which is closed at one of its extremities, so that the carrier, once propelled into this tube element compresses the air located between itself and the closed extremity of the pneumatic tube, which results in a slowing-down and stopping action on the conveyor carrier.

This device gives complete satisfaction in pneumatic installations which have two tubes, an outgoing tube and a return tube, in which the pneumatic carriers always travel in the same direction.

This is not the case in installations with a single pneumatic tube, inside which the carriers can travel in one direction or the other, depending on whether a given station is operating as a dispatching or as a receiving station.

The invention consists of adapting the known braking device for carriers by pneumatic damping at the end of the travel to pneumatic installations comprising a single tube in which the travel can be effected in both directions.

In installations of this kind, the slowing-down of the carriers in a pneumatic tube element closed at one of its extremities, comprises, according to the invention, at each extremity of the said element, a piping system provided with a floating valve which allows the air to pass in one direction and prevents its passage in the other, the two valves being mounted in opposition in such manner as to permit the intake of air at the closed extremity of the element.

The two pipes are coupled to the conduit system of the pumping machine which can operate either on suction or on delivery and provides the power necessary for the pneumatic displacement of the carriers.

During reception, the carrier may be either drawn or expelled into the pneumatic tube element closed at one of its extremities. In either case, the floating clapper-valve located on the upstream side will be open and the floating clapper-valve on the downstream side with respect to the direction of movement of the carrier will be closed, which ensures the slowing down of the carrier when it reaches this element.

A device of this kind has the advantage of permitting fully automatic operation, under the sole effect of the direction of the flow of air utilized for conveying the carriers.

The invention will now be illustrated by means of a certain number of examples of construction shown in the accompanying drawings, in which.

Figure 1:
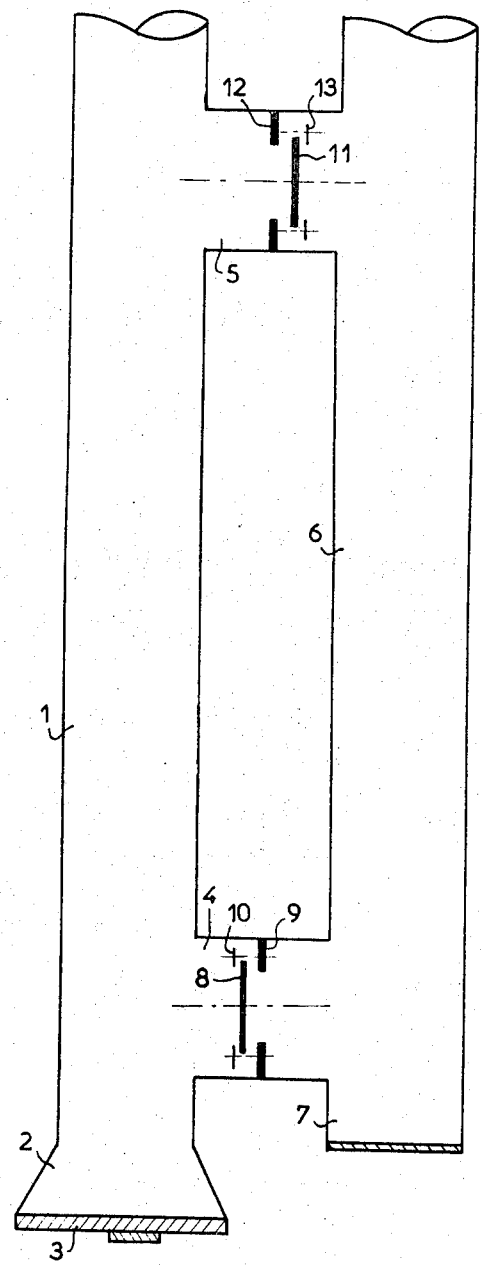
FIG. 1 shows a pneumatic station according to the invention providing for both reception and despatch by a single tube.

According to the example of construction shown in FIG. 1, a despatching-receiving station for pneumatic carriers according to the invention, comprises a pneumatic tube element 1, serving for the conveyance of the carriers and having its extremity 2 closed by a shutter 3. This element 1 is connected by two pipes 4 and 5 arranged as a branch circuit to the conduit 6 of the pumping machine which provides either a pressure or a vacuum. This conduit 6 is closed at its extremity 7, the closed extremities 2 and 7 of the tube and the conduit being located on the same side with respect to the pipes 4 and 5. The operation would be identically the same if the conduit were closed at its upper extremity and connected to the pumping machine by its lower extremity.

Each pipe 4 (or 5) is provided with a floating clapper-valve 8 (or 11) constituted by a light disc of plastic material, leather, rubber or any other appropriate material, floating freely in a guiding cape 10 (or 13) in which is provided a second fixed disc 9 (or 12), pierced with a central opening, the periphery of which serves as a seating for the floating valve. When the direction of flow of the air tends to lift the valve from its seat, the flow of air circulates freely. On the other hand, the clapper stops the flow of air when the latter applies the floating valve against its seat. The complete device necessitates two floating clapper-valves mounted in opposition, as shown in FIG. 1.

All the advantage of the floating clapper-valves resides in the fact that they are simple devices which operate automatically by the sole effect of the flow of air utilized for the conveyance of the carriers.

The operation of this device is the same whether the pumping machine is working in suction or in delivery.

The effectiveness of the automatic braking of the carriers increases in proportion with the distance which separates the two pipes 4 and 5 from each other. In practice however, this distance is limited by the layout conditions of the pneumatic circuit, to about two or three times the length of a carrier.

Figure 2:
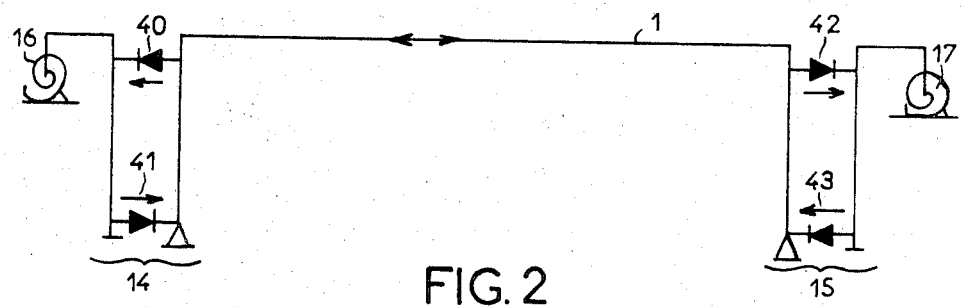
FIG. 2 shows a pneumatic installation according to the invention, with two despatching-receiving stations and two machines which can work in suction.

FIG. 2 shows a pneumatic installation according to the invention with two despatching-receiving stations 14 and 15, each equipped with the braking device shown in FIG. 1. The installation also comprises two suction machines 16 and 17 respectively associated with the stations 14 and 15, and the travel of the carriers between the two stations is effected in a single conveyor tube 1, in one direction or the other. The two floating clapper-valves with which each of the two stations is provided are indicated diagrammatically, the arrow showing in each case the direction of travel of the air when the floating clapper-valve is open.

The operation of such an installation is as follows:

When a despatch is effected from the station 14, the propulsion of the carriers is then ensured by the suction machine 17 located at the other end station 15 of the pneumatic tube. The suction of this machine closes the downstream floating clapper-valve 40 and opens the upstream floating clapper-valve 41 - with respect to the direction of travel of the carrier- of the despatching station.

The despatcher manually opens the shutter which closes the extremity of the pneumatic tube and introduces a carrier which is caught-up in the suction flow along the upstream pipe system and is sucked towards the other station. The despatcher re-closes the shutter which automatically locks itself.

When a reception is effected at the station 15, the vacuum is created by the suction machine 17 close to the station of destination. When this machine is in operation, the upstream floating clapper-valve 42 is opened and the downstream floating clapper-valve 43 - with respect to the direction of travel of the carrier - closes. The flow of conveying air in the pneumatic tube follows the upstream piping system and the pneumatic tube element comprised between the two floating clapper-valves is a closed space in which the carrier compresses the air and is thus effectively slowed down.

It is quite clear that the installation shown in FIG. 2 may also operate under pressure, if the machines 16 and 17 working on suction are replaced by machines 16 and 17 working on compression. In this case, there is the same quality of braking of the carriers on their arrival, the only difference being that during a despatch, it is the machine adjacent to the despatching station which is actuated, while for a reception the pressure is provided by the machine at the other station.

Such an installation permits of a displacement of carriers in a simple to-and-fro movement in a single pneumatic tube between two stations.

Figure 3:
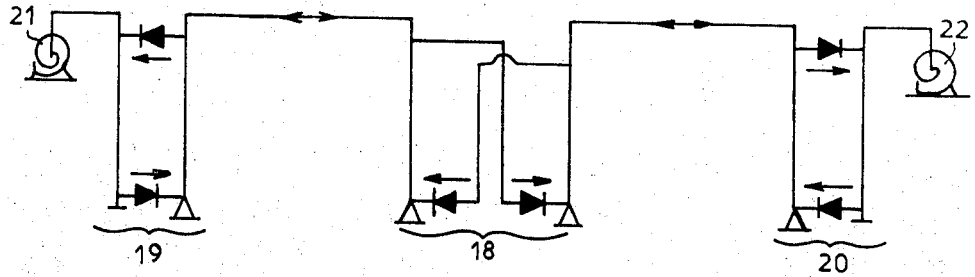
FIG. 3 shows a pneumatic installation according to the invention, of the same kind as that shown in FIG. 2, but permitting the operation in the same direction of two pneumatic carriers at the same time, each located in a different circuit.

If it is desired to effect communications in a double to-and-fro system from a given station, that is to say communications with two other stations by a single tube in one direction or the other, there may be employed an installation such as shown in FIG. 3.

In order to connect the station 18 in a shuttle service to two other stations 19 and 20 according to the invention, it is economical to effect the operation of both the two connections with two machines 21 and 22 only (and not four) installed in the vicinity of the end stations 19 and 20. This assumes, of course, that the whole of the two distances between the stations is relatively moderate and is compatible with the power of the machines provided for ensuring the transport of the carriers.

In this case, the floating clapper-valves continue to play their part in the braking of the arrival of the pneumatic carriers, whether the pneumatic tube is working under vacuum or under pressure.

The end stations 19 and 20 each comprise, without any modifications, the device indicated for one of the stations shown in FIG. 2 and a machine working under vacuum or under pressure.

With regard to the central station 18 at which the two shuttle services terminate, this is equipped with a set of two floating clapper-valves connected to the points of despatch and reception of each of the two lines, as indicated in FIG. 3. The operation of the various clapper-valves during a despatch or a reception, either under vacuum or under pressure, is similar to that of the installation of FIG. 2.

Figure 4:
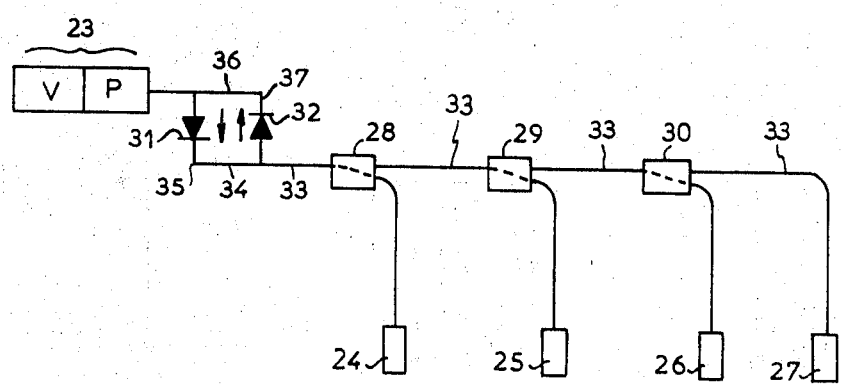
FIG. 4 represents another pneumatic installation according to the invention, comprising a series of four despatching-receiving stations coupled in parallel with a main pneumatic tube and working with a pumping machine which alternatively creates either a vacuum or a pressure.

There has been shown in FIG. 4 a further pneumatic installation which makes use of the floating valve device according to the invention.

Pneumatic installations are already known which comprise a main pneumatic tube 33 on which are mounted pneumatic branch tubes connected to the main tube by air-tight switching points 28, 29 and 30. By virtue of a pumping system 23 capable of operating alternatively under vacuum or under pressure and located for example at one of the extremities of the line, as shown in FIG. 4, the installation permits intercommunication between a number of pneumatic stations 24, 25, 26 and 27, in one direction or in the other, with a single pneumatic conveyor tube.

In an installation of this kind, a carrier despatched from any one of the stations 24, 25, 26 or 27 is first of all sucked into the main tube 33 and is then delivered under pressure through a portion of the main tube and the branch tube corresponding to the station of destination.

In order that the carrier may obey this reversal of condition, which passes from suction to delivery, its travel under vacuum must be stopped. To this end, it is possible:

either to stop its movement before the pumping machine against a fixed abutment in the interior of the tube, in which case the carrier becomes rapidly deteriorated by severe and repeated shocks;

or to arrange between the end station 24 and the pumping machine 23, a pneumatic tube element having a length of at least 10 metres, in which the carrier loses its speed by inertia, this however being practically impossible to achieve in the majority of installations.

In order to avoid these disadvantages, it is possible to effect the connection according to the invention between the conduit 36 of the pumping system, one of the extremities 37 of which is closed, and an element 34 of the main pneumatic tube 33, closed at one of its extremities 35, by the addition to each extremity of this element, of a piping system provided with a floating clapper-valve, the two valves 31 and 32 being mounted in opposition and in such manner as to permit the arrival of air at the closed extremity of the element.

During operation under vacuum, the floating valve 31 is closed and the floating valve 32 is open. The carrier arriving in the element 34, which is closed, is stopped rapidly and without any shock.

A device of this kind is also applicable if the stations are provided with an automatic carrier despatching system. In the case of the installations shown in FIGS. 2 and 3, the admission of outside air into the main pneumatic tube in the case of operation under vacuum, or its evacuation in the case of operation under pressure, is effected through the opposite machine which is assumed to be of the centrifugal type. A centrifugal machine when stopped has in fact a large clearance between the turbine and the body which readily permits the passage of air and only creates a negligible loss of pressure.

This is not the case when the great length of the pneumatic tube is the cause of a large drop in pressure which a centrifugal machine cannot overcome. It is then necessary to employ a volumetric machine capable of supplying a vacuum (or a pressure) three or four times higher than that of a centrifugal machine. However, a volumetric machine is formed by a rotary system which is closely fitted into the interior of the body of the machine, and which does not permit the passage of the air to be admitted into the pneumatic tube when the machine is stopped.

It is therefore necessary to add to the volumetric machines of a pneumatic tube serving for the conveyance of carriers in one direction or in the other, an automatic air-inlet device.

This automatic device may be either an electrical or pneumatic valve, the overall size and weight of which result in additional cost of installation and in which especially the cost is high when the diameter of the line tube is large, or a double floating clapper-valve.

When a pneumatic installation comprises a volumetric machine, the device for slowing down the carriers in a pneumatic tube element closed at one of its extremities, comprises according to the invention a piping system connecting together the two extremities of this element and provided with a floating clapper-valve having a double seating and a volumetric pump connected in series, this valve being interposed between the machine and the closed extremity of the element.

Figure 5:
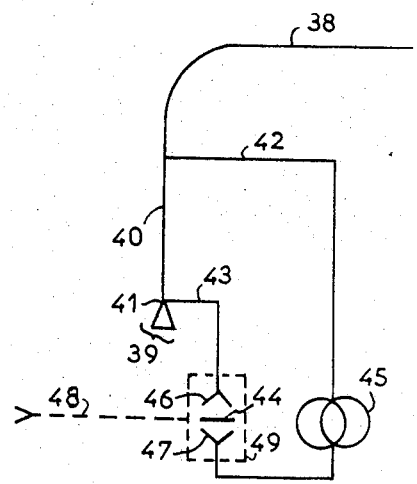
FIG. 5 represents an alternative form of a pneumatic installation according to the invention, comprising a volumetric blower machine.

An installation of this type is shown in FIG. 5. The station 39 provides for the despatch or reception of pneumatic carriers travelling inside a pneumatic tube 38 which terminates in an element 40, the extremity 41 of which is closed by a shutter. A piping system 42 located at the non-closed extremity of the element 40, passes successively through a volumetric machine 45 and a floating clapper-valve 44 with a double seating, before terminating in a pipe 43 at the closed extremity of the element 40.

The floating valve 44 with a double seating is constituted by a light disc as described above, floating freely between two fixed discs 46 and 47 pierced with a central hole in the interior of a guide-cage interposed between the station 39 and the volumetric machine 45.

The piping 42 is connected to the pneumatic tube at a distance from the station equal to about two or three times the length of a pneumatic carrier.

The operation of this installation is as follows:

When a despatch is effected and the installation is designed to operate under vacuum for example, the vacuum is created by the pump at the other station. The floating clapper-valve 44 with a double seating, which normally rests on its lower seating 47, leaves free the orifice of the upper seating 46 through which the outside air is admitted into the pneumatic tube element 40 through the intermediary of the piping 43. As soon as it is introduced into the vicinity of the closed extremity of the element 40, the carrier is sucked along by the flow of air which propels it towards the other station.

When a reception is effected, which will also be assumed to be in a vacuum system, it is the volumetric machine 45 in the vicinity of the receiving station which is started-up, and air is admitted to the pneumatic tube 38 at its other extremity, not shown in FIG. 5. The delivery pressure of the machine 45 lifts the floating clapper-valve 44 which, simultaneously acted upon from below by a pressure and from above by the vacuum existing in the pneumatic tube, closes the orifice of the upper seating 46 and opens that of the lower seating 47 through which the exhaust of the machine 45 flows. At its arrival, the carrier passes into the closed tube element 40 and is therefore braked by compressing the air in the tube in front of it.

It will be noted that an installation of this kind can also operate under pressure in one direction or in the other.

In addition to its simplicity and its low production cost, this installation has a further very important advantage which is as follows:

When a pneumatic tube, acting in one direction or the other, connects together two distant buildings, following a path in which there exists a substantially uniform temperature, the external air is admitted into the tube at the floating clapper-valve with a double seating.

On the other hand, if this pneumatic tube passes into cold rooms, (attics, empty sanitary spaces, external gutters for example), the propulsion of the pneumatic carriers is liable to be hindered by the production of condensed water inside the tube. It is then essential to introduce into the tube only air which has a sufficiently low temperature so that there cannot rise any condensation during the course of its passage through the coldest places. This air must therefore be taken from a room at low temperature if such exists in proximity to the tube or the air must be condensed in a refrigerator.

For this purpose, the floating clapper-valve 44 may be enclosed in a fluid-tight casing 49 which is connected by a conduit 48 to a cold room or a refrigerator, as shown in dotted lines in FIG. 5.

The floating clapper-valve with a double seating thus replaces a set of valves with electrical or pneumatic operation which are very expensive. This replacement is very advantageous, since this system is simpler and its automatic operation is more reliable because it only makes use of the flow of air utilized for the propulsion of the pneumatic carriers.

I claim:

1. An installation for conveying carriers by a pneumatic tube, comprising a pneumatic tube in which the displacement of the carriers is effected in one direction or in the other, a volumetric pumping machine facilitating the reversal direction of the flow of air serving to propel carriers inside the tube, and at least one station permitting the despatching and reception of said carriers, said installation being characterized in that the said pneumatic tube comprises a closed extremity terminating in a station with two piping systems coupled to each other through the intermediary of a floating clapper-valve with a double seating and said volumetric pumping machine connected in series, said clapper-valve being interposed between said machine and the piping which is closest to the closed extremity of the pneumatic tube.

2. An installation in accordance with claim 1, characterized in that the said floating clapper-valve with double seating is enclosed in a fluid tight casing which communicates with a source of refrigerated air at a temperature lower than the temperatures existing in the various parts of the installation.

* * * * *